United States Patent [19]

McBrayer

[11] Patent Number: 4,814,360

[45] Date of Patent: Mar. 21, 1989

[54] HIGH RESILIENCY MOLDED FOAM CONSISTING OF THE REACTION PRODUCT OF A POLYISOCYANATE, A POLYOXYALKYLENE POLYETHER POLYOL, WATER AND A HALOGENATED MONOHYDRIC ALCOHOL

[75] Inventor: Robert L. McBrayer, Lincoln Park, Mich.

[73] Assignee: BASF Corporation, Parsippany, N.J.

[21] Appl. No.: 113,295

[22] Filed: Oct. 26, 1987

Related U.S. Application Data

[63] Continuation-in-part of Ser. No. 870,880, Jun. 5, 1986, abandoned.

[51] Int. Cl.[4] .................. C08G 18/00; C08G 18/14; C08J 9/00
[52] U.S. Cl. ................................ 521/171; 521/117; 521/904
[58] Field of Search .................. 521/117, 171, 904

[56] References Cited

U.S. PATENT DOCUMENTS

| | | | |
|---|---|---|---|
| 3,756,970 | 9/1973 | Bauchwitz | 521/106 |
| 3,891,579 | 6/1975 | Cenker et al. | 521/117 |
| 4,094,869 | 6/1978 | Biranowski et al. | 521/171 |
| 4,165,414 | 8/1979 | Narayan et al. | 521/117 |
| 4,326,043 | 4/1982 | Narayan et al. | 521/137 |

*Primary Examiner*—Harold D. Anderson
*Assistant Examiner*—Dennis R. Daley
*Attorney, Agent, or Firm*—William G. Conger

[57] ABSTRACT

High resiliency polyurethane foams are typically prepared by reaction of polyols blends comprising conventional and polymer containing polyols with aromatic polyisocyanates. Improved physical properties such as tensile strength, tear strength, and elongation of these foams can be achieved by incorporating 0.5 to 3.0 parts 2,3-dibromopropanol into the foam formulation.

8 Claims, No Drawings

HIGH RESILIENCY MOLDED FOAM CONSISTING OF THE REACTION PRODUCT OF A POLYISOCYANATE, A POLYOXYALKYLENE POLYETHER POLYOL, WATER AND A HALOGENATED MONOHYDRIC ALCOHOL

This is a continuation-in-part of application Ser. No. 870,880 filed June 5, 1986 now abandoned.

BACKGROUND OF THE INVENTION

1. Field of the Invention

This invention relates to the field of high resiliency molded polyurethane foams. More particularly, it relates to improvement in strength properties of the foams by use of 2,3-dibromopropanol.

2. Description of the Prior Art

The use of 2,3-dibromopropanol, hereafter referred to as DBP, as a reactive flame retardant for polyurethane foams is well known in the art.

British Patent No. 895,966 discloses the use of DBP as a flame retardant with continued efficiency in flame-proofing on accelerated aging. The foams described in this patent are rigid polyester foams. Nothing is disclosed regarding any other property effects with the exception of density. A further disclosure in British Patent No. 889,720 incorporates the use of antimony oxide for enhanced flame retardancy with DBP.

U.S. Pat. No. 3,772,222 relates to improvements in tear strength properties of high resiliency foams through the addition of halogenated phosphate esters such as tris(2,3-dibromoporopy) phosphate or by addition of certain plasticizers such as diethylphthalate or diisodecylphthalate. Reactive type flame retardant, such as DBP are not mentioned. Further, 4,4'-methylenebis (2-chloroanaline) is a necessary ingredient in the formulations disclosed.

U.S. Pat. No. 3,756,970 describes a process whereby compression set properties of a flexible foam are improved by the use of a combination of a halogen source (including DBP), a mineral acid, typical urethane catalysts, an undistilled phosgenation product of tolylene diamine, a polymeric polyol and a cross-linking agent.

Since DBP is a mono-functional alcohol, its incorporation into a foam formulation would not be expected to improve strength properties, rather it would be expected to weaken the foam and make it softer. Surprisingly it has been found that DBP used in a high resiliency foam formulation based on a blend of conventional and graft polyols using a blend of TDI and crude MDI as the isocyanate produces a foam with improved tensile and tear strength properties without significant softening of the foam. This is accomplished without further formulation modification. No cross-linker (as in the case of U.S. Pat. Nos. 3,772,222 or 3,756,970) or mineral acid is used.

SUMMARY OF THE INVENTION

It has now been found that in the process for the preparation of high resiliency molded polyurethane foams obtained by the reaction of blends of conventional polyols and polymer containing polyols with aromatic polyisocyanates, incorporating less than flame retardant quantities of halogenated monohydroxyl compounds in the formulation improves the physical properties of the resultant foams without affecting the foam resiliency.

DESCRIPTION OF THE PREFERRED EMBODIMENTS

High resiliency polyurethane foams are typically prepared from blends of essentially primary hydroxyl terminated conventional polyols and graft polymer dispersion polyols reacted with mixtures of aromatic polyisocyanates. According to the present invention, physical properties of polyurethane foams from such formulations can be improved by addition of small amounts of halogenated alcohols to the formulation without further formulation change.

Representative polyols which may be employed in the preparation of the flame retardant polyurethane foams are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the equivalent weight of the polyols will vary from 100 to 10,000, preferably from 200 to 2500.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, 1,4-diaminobutane, and ammonia.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

Other polyols which may be employed have incorporated therein vinylic polymers. These polyols may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092; 4,014,846; 4,093,573; and 4,122,056, the disclosures of which are herein incorporated by reference, or (3) by low temperature polymerization in the presence of chain transfer agents. These polymerizations may be carried out at a temperature between 65° C. and 170° C., preferably between 75° C. and 135° C.

The polyols which may be employed in the preparation of the graft polymer dispersions are well known in the art. Both conventional polyols essentially free from ethylenic unsaturation such as those described in U.S. Reissue Pat. No 28,715 and unsaturated polyols such as those described in U.S. Pat. Nos. 3,652,659 and U.S. Pat. No. Re. 29,014 may be employed in preparing the graft polymer dispersions used in the instant invention, the disclosures of which are incorporated by reference.

The polyurethane foams employed in the present invention are generally prepared by the reaction of a polyoxyalkylene polyether polyol with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane foams are disclosed in U.S. Pat. No. Re. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane foams by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate. Toluene diisocyanate is preferred.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

Preferred conventional polyols used in the present invention are polyoxyalkylene polyethers which are essentially primary hydroxyl terminated and which are obtained by the polyaddition of aliphatic cyclic ethers having 2 to 4 carbon atoms to low molecular weight initiator molecules having 2 to 4 Zerwittinoff active hydrogen atoms. Examples of suitable initiators are difunctional, such as ethylene glycol, propylene glycol, dipropylene glycol or mercaptoethanol, 1,4-butanediol, trifunctional such as glycerine, trimethylolpropane, 1,2,5-hexanetriol, or ethanolamine; and tetrafunctional, such as erythritol, pentaerythritol, α-methyl glucoside, phenylenediamine, or bis(2,3-dihydroxypropyl) ether. The average functionality of the conventional polyol is adjusted by initiator selection or blending to be 2.5–3.0. The preferred initiators are glycerine and trimethylolpropane. The initiators are reacted with 1,2-alkylene oxides such as ethylene oxide, propylene oxide, or 1,2-butylene oxide. Alternatively, the initiators can also be reacted with a polymerizable cyclic ether such as tetrahydrofuran. The preferred adduct is based on propylene oxide, ethylene oxide, or mixtures thereof. Essentially primary hydroxyl group termination is achieved by "end-capping" with ethylene oxide. The primary hydroxyl content preferably ranges from about 10 weight percent to about 90 weight percent primary hydroxyl groups. The preferred hydroxyl number of the resultant polyol ranges from 22 to 60 (mg KOH/g).

The physical properties such as tensile strength, tear strength, and elongation of the polyurethane foams resulting from the above-described formulation are improved without affecting foam resiliency by the incorporation into the formulation of small amounts of halogenated monohydric alcohols having from 2 to 6 carbon atoms. Examples of such alcohols which are useful include 2-chloroethanol, trichloroethanol, dichloropropanol, tribromoethanol, bromochloropropanol, tetrachlorobutanol, and preferably, 2,3-dibromopropanol. Such halogenated alcohols are used in quantities less than that which imparts fire retardancy. Dibromopropanol is used at the level of about 0.5 part to about 3 parts per hundred parts of polyol in the formulation.

The following examples exemplify the preferred embodiments of this invention without intent to limit the scope. The raw materials used in these examples were:

Polyol A—A 35 hydroxyl number, 14 percent ethylene oxide capped oxypropylated glycerine polyol.

Polyol B—A 25 hydroxyl number graft polymer dispersion polyol containing a dispersion of 20 percent acrylonitrile and styrene in a 2:3 ratio.

Isocyanate—A blend of 20 weight percent "crude MDI" (aniline-formaldehyde condensate-based polyisocyanate having an average functionality of 2.7 isocyanate groups per molecule) and 80 weight percent of an 80:20 2,4:2,6-toluene diisocyanate isomer mixture.

Catalyst 1—A 70/30 blend of bis(2-dimethylaminoethyl) ether/dipropylene glycol sold by Union Carbide Company as NIAX Catalyst A-1.

Catalyst 2—A proprietary tertiary amine catalyst sold by Union Carbide Company as NIAX Catalyst A-4.

Catalyst 3—1,4-diazobicyclooctane sold by Air Products and Chemicals as DABCO 33LV.

Catalyst 4—Unstabilized stannous octoate sold by M&T Chemicals as THERMOLITE 31.

Surfactant—A proprietary silicone surfactant sold by Union Carbide Company as L5303.

Dibromopropanol—2,3-dibromopropanol sold by Great Lakes Chemicals as BROMINEX 257.

The foams obtained were tested for the properties reported according to the methods given in ASTM D-2406, now ASTM D-3574. Unless otherwise indicated, all parts given in the following examples are parts by weight.

EXAMPLES

Using the general procedure described, foams were made on a small low pressure foam machine at an output of approximately 6 kilograms per minute. Component temperatures were 24° C. Molded foam blocks were made using a 38 by 38 by 11 cm aluminum block mold and an overpack of 5 percent of free rise density. Initial mold temperature was 38°±2° C. and a conventional synthetic wax mold release was used. Following the pouring of the foam ingredients into the mold and mold closure, the mold was put in an oven maintained at 150° F. for approximately 14 minutes. The part was demolded 15 minutes after pour. The parts were not post-cured following demold.

The formulation used in the preparation of foam is that given in Table I.

TABLE I

| HIGH RESILIENCY FOAM FORMULATION, pbw | |
|---|---|
| Polyol A | 60 |
| Polyol B | 40 |
| Water | 2.6, 3.0 |
| Catalyst 1 | 0.12 |
| Catalyst 2 | 0.3 |
| Catalyst 3 | 0.1 |
| Surfactant | 1.6 |
| Catalyst 4 | 0.03 |
| Dibromopropanol | 0, 3.0 |
| Isocyanate | (103 Index) |

EXAMPLES 1 AND 2

Using the general formulation given in Table 1, duplicate foam preparations at each water levels of 3.0 parts (Example 1) and 2.6 parts (Example 2) using 3.0 parts added dibromopropanol in each case were prepared. The results of physical property measurements on three specimens of each of the foams are summarized (average) in Table II.

COMPARATIVE EXAMPLES A AND B

Preparation of foam samples as indicated in Examples 1 and 2 were repeated with the modification that no dibromopropanol was used. The results of tests on these foams are also given in Table II.

As shown by the results of these direct comparisons, the addition of dibromopropanol to the formulation resulted in a twenty percent increase in tensile strength, a thirty-three percent increase in tear strength, a twenty-six percent increase in elongation while the resiliency of the foa remained essentially unchanged.

TABLE II

| | PHYSICAL PROPERTIES OF FOAMS | | | | | |
|---|---|---|---|---|---|---|
| | Formulation, pbw | | Tensile | Tear, | Elongation | Resiliency |
| | Water | DBP | kPa | N/M | % | % |
| Example 1 | 3.0 | 3.0 | 144 | 345 | 199 | 45.2 |
| Example 2 | 2.6 | 3.0 | 144 | 368 | 196 | 42.2 |
| Comparative Example A | 3.0 | 0.00 | 122 | 278 | 158 | 43.1 |
| Comparative Example B | 2.6 | 0.0 | 123 | 273 | 153 | 43.5 |

EXAMPLES 3-5

The general procedure described above was employed for Examples 3-15. A statistically designed experiment was run with water and dibromopropanol as the independent variables. The isocyanate quantity was adjusted to compensate for the changing hydroxyl content to maintain the NCO index at 103. The foams were tested according to the methods given in ASTM D-2406, now D-3574. The data were then utilized in a computer analysis program to determine the variable effects. The results of this program are given in Table III, Examples 3-15. The computer programs are similar to those discussed in "Equipmental Designs" by Cochran, W. G. and Cox, G. M. published by John Wiley & Sons, 1957, N.Y., N.Y., 2nd Edition, and "The Two K-p Fractional Factorial Designs" by Box, G. E. P., and Hunter, J. S. "Technometrics," Vol. III, pp. 311-351.

TABLE III

| Example | Water, pbw | Dibromopropanol, pbw |
|---|---|---|
| 3 | 3.0 | 0 |
| 4 | 2.6 | 3 |
| 5 | 2.6 | 0 |
| 6 | 2.8 | 1.5 |
| 7 | 3.0 | 3 |
| 8 | 2.8 | 1.5 |
| 9 | 3.0 | 3 |
| 10 | 2.8 | 1.5 |
| 11 | 2.8 | 1.5 |
| 12 | 3.0 | 0 |
| 13 | 2.6 | 3 |
| 14 | 2.6 | 0 |

EXAMPLES 3-15

EXAMPLE 3

Density, $Kg/M^3$
High value=41.4
Low value=34.2
The density increased slightly with increasing DBP level.

EXAMPLE 4

Tensile, kPa
High 153
Low 113
Significant improvement obtained by adding DBP.

EXAMPLE 5

% Elongation
High 198
Low 150
Significant improvement obtained by adding DBP.

EXAMPLE 6

Tear N/M
High 364
Low 271
Significant improvement obtained by adding DBP.

EXAMPLE 7

25% ILD kg
High 12.9
Low 10.3
Some softening due to DBP addition.

EXAMPLE 8

65% ILD kg
High 36.6
Low 30.6
Some softening due to DBP addition.

EXAMPLE 9

Sag Factor
High 3.0
Low 2.8
Improved with increasing DBP or water level.

EXAMPLE 10

% Recovery
High 79.6
Low 73.3
Decreased with increasing EBP or water level.

EXAMPLE 11

50% Original Compression Set
High 20.8
Low 11.4
Increased with increasing DBP or water level.

EXAMPLE 12

90% Original Compression Set
High 72.5
Low 4.0
DBP adversely affected results.

EXAMPLE 13

50% Humid Aged CLD
High 43.4
Low 34.1
Improved significantly with DBP addition.

EXAMPLE 14

50% Humid Aged Set
High 38.9
Low 22.2
Increased with high levels of DBP.

EXAMPLE 15

90% Humid Aged Set
High 77.0
Low 40.5
Slight improvement at increased DBP levels.

The embodiments of the invention in which an exclusive privilege or property is claimed are defined as follows:

1. A high resiliency molded polyurethane foam consisting of the reaction product of an organic polyisocyanate, a polyoxyalkylene polyether polyol, water and a halogenated monohydric alcohol in the presence of a urethane-forming catalyst wherein the concentration of said alcohol is from about 0.5 part to about 3 parts per hundred parts of polyol.

2. The foam of claim 1 wherein the halogenated monohydric compound is 2,3-dibromopropanol.

3. The foam of claim 1 wherein the organic polyisocyanate is selected from the group consisting of toluene diisocyanate and diphenylmethane diisocyanate and mixtures thereof.

4. The foam of claim 1 wherein the polyoxyalkylene polyether polyol is selected from the group consisting of primary hydroxyl terminated polyol, a graft dispersion polyol and mixtures thereof.

5. A process for preparing a high resiliency molded polyurethane foam consisting of reacting an organic polyisocyanate, a polyoxyalkylene polyether polyol, water, and a halogenated monohydric alcohol in the presence of a urethane-forming catalyst wherein the concentration of said alcohol is from about 0.5 part to about 3 parts per hundred parts of polyol.

6. The process of claim 5 wherein the halogenated monohydric compound is 2,3-dibromopropanol.

7. The process of claim 5 wherein the organic polyisocyanate is selected from the group consisting of toluene diisocyanate and diphenylmethane diisocyanate.

8. The process of claim 5 wherein the polyoxyalkylene polyether polyol is selected from the group consisting of primary hydroxyl terminated polyol, a graft dispersion polyol and mixtures thereof.

* * * * *